United States Patent [19]

Slocum et al.

[11] Patent Number: 4,694,230

[45] Date of Patent: Sep. 15, 1987

[54] MICROMANIPULATOR SYSTEM

[75] Inventors: Alexander H. Slocum, McLean, Va.; James P. Peris, Germantown, Md.

[73] Assignee: USA as represented by the Secretary of Commerce, Washington, D.C.

[21] Appl. No.: 838,748

[22] Filed: Mar. 11, 1986

[51] Int. Cl.[4] ............................................. G05B 19/10
[52] U.S. Cl. .................................... 318/568; 364/513; 901/30; 901/68; 901/9; 901/22
[58] Field of Search ............. 318/568, 568 D, 568 H, 318/594, 640 C; 901/30, 34, 9, 10, 22, 46, 50; 364/474, 513

[56] References Cited

U.S. PATENT DOCUMENTS

| | | | |
|---|---|---|---|
| 3,327,101 | 6/1967 | Evans | 318/594 |
| 3,824,674 | 7/1974 | Inoyama | 901/34 |
| 3,885,295 | 5/1975 | Engelberger | 901/30 |
| 3,906,325 | 9/1975 | Salmon | 901/34 |
| 3,984,006 | 10/1976 | Takeyasu | 901/34 |
| 3,984,009 | 10/1976 | Holroyd | 901/30 |
| 4,119,211 | 10/1978 | Flemming | |
| 4,155,169 | 5/1979 | Drake | 901/34 |
| 4,362,977 | 12/1982 | Evans et al. | |
| 4,419,041 | 12/1983 | Rose | |
| 4,485,453 | 11/1984 | Taylor | 318/568 |
| 4,510,683 | 4/1985 | Fedde | 901/9 |
| 4,521,966 | 6/1985 | Karlsson | 901/46 |
| 4,544,889 | 10/1985 | Hendriks | 318/640 |
| 4,561,176 | 12/1985 | Leddet | 901/30 |
| 4,595,334 | 2/1986 | Sharon | 414/735 |
| 4,600,869 | 7/1986 | Sekino | 318/640 |

OTHER PUBLICATIONS

Enhancement of Robot Accuracy Using a Macro/Micro Manipulator System by Andre Sharon; 1981.

Primary Examiner—William M. Shoop, Jr.
Assistant Examiner—Patrick C. Keane
Attorney, Agent, or Firm—Alvin J. Englert; Douglas E. Jackson

[57] ABSTRACT

A micromanipulator system for precisely positioning an object in an xz plane and then grossly moving the object in the y direction into a hole z is disclosed. The micromanipulator system includes a base and a platform mounted to the base having five different degrees of movement (in the x direction, y direction, z direction, about the x axis, and about the z axis). Suitable moving mechanisms are provided for reversibly moving the platform in the five degrees of movement. Four of the degrees of movement being for fine or precise positioning of the platform and the fifth degree of movement in the y direction being a coarse positioning movement. A device for holding the obejct to the platform is then provided such that after precisely positioning the platform in the xz plane, the object is coarsely moved in the y direction toward the hole. Preferably, a device is provided for detecting an opposition force to the coarse movement of the object in the y direction. In addition, measuring devices are provided for measuring movements of the platform in each of the five degrees of movement. Preferably, the moving mechanisms are linear actuators, two of which serve for axles for rotation of the platform about the x and z axes. A suitable rolling friction system is provided with the linear actuators which includes a ball in a rounded trough. The object is inserted in the hole by a suitable search pattern after a robot initially locates the micromanipulator adjacent the hole.

8 Claims, 8 Drawing Figures

MICROMANIPULATOR SYSTEM

FIELD OF THE INVENTION

The present invention relates generally to the automatic positioning of an object, and more particularly to the automatic positioning of an object with respect to a hole or the like.

BACKGROUND OF THE INVENTION

A problem with prior art robotic systems is the poor accuracy and repeatability of the robots, and the resulting inability of robots to put a peg into a close fitting hole. Most automated processes utilize some sort of robotic manipulator for material handling or assembly operations. To increase productivity and quality, critical metrology standards are maintained, but this requires the use of more accurate machine tools, parts, holding fixtures, and finished parts. As a result, method and apparatus to overcome the problems of accuracy and repeatability in robots are needed.

In particular, large robotic manipulators (in the order 36 inches reach and 20 pounds payload) can only be used to repeat previously taught positions at best to within 0.010 inch. However, to make use of such repeatability, it would be necessary to add different robot programs for different cycles of use and environmental conditions. Thus, it is appreciated that there is a need to assist a robot in loading of a part into a collet (peg in hole) or otherwise increase the accuracy of robot movements.

In U.S. Pat. No. 4,362,977 (Evans et al), a manually manipulated teaching robot is disclosed. The teaching robot is used to program the movements of a larger robot. While this increases the ease with which the larger robot may be taught new positions, this does nothing to increase the accuracy or repeatability of the robot motions. In U.S. Pat. No. 4,419,041 (Rose), a system of gears and racks is used to record the three Eulerian angles that a single arm can trace out in space (including twist of the arm about its length) and the extension of the arm via a telescoping tube. Accuracy on the order of 1 part in 7,000 is claimed, but this is an order of magnitude less than required for many large robotic applications. This method is also not applicable to multi-arm structures and does not address environmentally induced errors (heat expansion of metal)

In U.S. Pat. No 4,119,212 (Flemming), a "knee" joint with a planar goniometer attached is disclosed. This system is not structurally stable because a large static error in the measuring system occurs when the linkage is straightened out and gravity applied normal to its length and the axis of the joint rotation. Since the two lengths are connected by an angular measuring device (which is only supported by the links) and supported at their ends by angular measuring devices, no bending moments are transferred about the joint axis. Since no length adjustment is allowed for, the links sag until steady equilibrium is reached. In addition, no out of plane bending moment is measured with this device. This, this device does not provide a means to allow a robot to load a collet accurately.

In "Enhancement of Robot Accuracy Using a Macro/micro Manipulator System" by Andre Sharon, a masters thesis submitted to the Massachusetts Institute of Techology in September 1983, and in U.S. Pat. No. 4,595,334 (Sharon) a micromanipulator is disclosed which is attached to a larger robot manipulator. According to the disclosed system, a large robot is used to carry a micromanipulator to an area of interest. Thereafter, using the micromanipulator for fine motion, an exact positioning of an object is achieved. The micromanipulator has five degrees of freedom including three linear degrees and two rotational degrees. Suitable linear actuators are provided for controlling the degrees of movement. However, the device disclosed in this reference is subject to large friction forces which retard movements along the five degrees of freedom and which retard movements of very limited size in all five degrees of freedom. Also the design is heavy and bulky.

From the above prior art devices, it can be appreciated that reliance on the accuracy of mechanical components is not sufficient. In fact, the basic physics of the situation is that most structural components cannot be machined to 0.0001 inch, which when multiplied by an arm length of 50 inches in three joints, leaves an error on the order 0.0015 inch. Thus, in order for a robot to be able to consistently put a peg in a hole, it must have some sort of compliance mechanism (which is how a human loads a part by feel) or an active measurement system that will allow the robot to servo in on the correct location.

Passive compliance systems (such as the remote center compliance system developed at Draper Laboratory in Cambridge, Mass.) can be useful for inserting parts in a vertical hole. However, the compliance device must be matched with a part weight and only works well in the vertical mode. For a robot loading a collet on a machine tool with a horizontal spindle, a wide variety of part sizes must be accommodated and compliance mechanisms have difficulties operating under these conditions.

Another problem with compliance devices is that they require the robot controller to be able to command the robot to make small dither type motions to get the part into the hole. Use of compliance devices thus requires force feedback so that the robot will not push too hard and damage the system. The majority of robots, however, can only repeat previously taught moves and position servo between previously taught points. This precludes use with respect to search and find algorithms and use of auxiliary feedback from foreign sensors. Thus, in order to use existing robots, these robots would need to be retrofitted with new electronic controllers and force sensor systems whose cost would be relatively large. In addition, commercial software is not available for use for this type of system at present.

SUMMARY OF THE INVENTION

In accordance with the present invention, a micromanipulator is provided which is used to retrofit existing robots with an "active compliance system" that will enable the robots to not only feel how a part is going into a hole, but also to provide five degrees of freedom at the robot wrist to enable the robot to easily wiggle the part into the hole in the same manner that a human hand with dexterity would without requiring retrofitting of the robot controller. In addition, these five degrees of freedom can be used as a fine positioning mechanism at the end of the coarse positioning system (a large robot) to provide fine positioning capability should an endpoint positioning measurement system become available.

The micromanipulator system of the present invention is thus used for precisely positioning an object in an xz plane and then for grossly moving the object in a y direction perpendicular to the xz plane which action is equivalent to the movement of a peg into a hole. The micromanipulator system includes a base which defines a x axis, a y axis, and a z axis. A platform is suitably mounted to the base so as to have five different degrees of movement. These degrees of movements are in the x, y, and z directions as well as about x and z axes. Moving means are provided for reversibly moving the platform in the five degrees of movement. The x position moving means and the z position moving means precisely position the platform a small distance in the respective x and z directions. However, the y position moving means is used to position the platform a large distance in the y direction and the y direction is taken as the direction for insertion of the peg or object into the hole. A means for holding the object to the platform is also provided so that by precisely positioning the platform in and about the x and z directions, a large y movement is then provided to insert the peg in the hole.

In the preferred embodiment, the micromanipulator includes a force detecting means for detecting an opposition force exerted on the object which opposes the movement of the object in the y direction by the y position moving means. Preferably, a measuring means is also provided for measuring movements of the platform in the five degrees of movement. A suitable force detecting means is the sensing by the measuring means of a predetermined rotation about one of the x or z axes, whose rotational stiffness is known, which occurs when an opposition force is exerted on the object moving in the y direction.

In the preferred embodiment, the x position moving means and z position moving means are linear actuators, and these linear actuators serve as axles about which the platform rotates about the x and z axes. Preferably, the linear actuators include pairs of opposed hydraulic pistons. In addition, x rotation rotary actuators and z rotation rotary actuators are provided which also take the form of linear actuators located on opposite sides of respective x and z axes so as to produce torques about the respective axes which are opposite one another.

According to the preferred embodiment, the base further includes a fixed plate against which the x position moving means and y position moving means push. With this construction, the interface between the actuators is a rolling friction element means to provide relatively frictionless and precise movement of the platform. The rolling friction element means preferably includes a concavity in the end of a respective linear actuator, a ball located in the concavity, and a rounded trough in the fixed plate in which the respective ball is located. Thus, movement along the x or z axis occurs as the ball rolls along the length of the trough while movement about a respective x or z axis occurs as the ball rides up and down the sides of the rounded trough.

The micromanipulator system of the present invention preferably further includes a robot means for initially positioning the base adjacent to the xz plane in which the object is to be inserted. A search means is then provided for repetitively moving the platform adjacent to the xz plane in a suitable search pattern and subsequently after each move for actuating the y position moving means to attempt a desired movement of the object at that position of the search pattern into the xz plane.

It is a feature of the present invention that an intermediary device is provided which is adapted to be easily and simply mounted on existing robot systems.

It is an advantage of the present invention that the micromanipulator accomodates translation errors in robots which can be relatively large because angular errors at the joints are amplified by the length of the robot arms. It should also be appreciated that although orientation errors are not amplified, the micromanipulator of the present invention is also capable of compensating for orientation errors as well.

It is also a feature of the present invention that the two dimensional location of the center of the part or object with respect to the hole is controllable in order to line up the centers of the part and hole (xz positioning). In addition, the tilt of the object (about the x and z axes) is also controlled in order to keep the object from becoming cocked as it is inserted into the hole. Finally, movement along the y axis is provided in order to insert the part in the hole once position and orientation of this object with respect to the hole is achieved.

It is a further feature of the present invention that the degrees of freedom along and about the x and z axes are relatively small ($+/-0.13$ inch and $+/-4$ degrees). However, the movement along the y axis is relatively large (approximately an order of magnitude larger, as between $+/-1.0$ to $1.5$ inch).

Thus, it is an object of the present invention to provide a computer controlled micromanipulator device which can position and force servo its degrees of freedom. The micromanipulator is placed at the end of a robot arm and has a gripping mechanism attached to it that holds a part while the micromanipulator uses special algorithms to move about its axes of motion and to insert the part into the hole. Ultimately, the micromanipulator can use input from an endpoint positioning system to allow fine positioning of the robot endpoint.

It is also an object of the present invention to provide a method for controlling the axes of motion of the micromanipulator that allows it to insert a part in a hole even though the part longitudinal axis is not initially colinear with the longitudinal axis of the hole.

Other features, objects, and advantages of the present invention are stated in or apparent from a detailed description of a presently preferred embodiment of the invention found hereinbelow.

DETAILED DESCRIPTION OF THE PREFERRED EMBODIMENT

Figure 1:
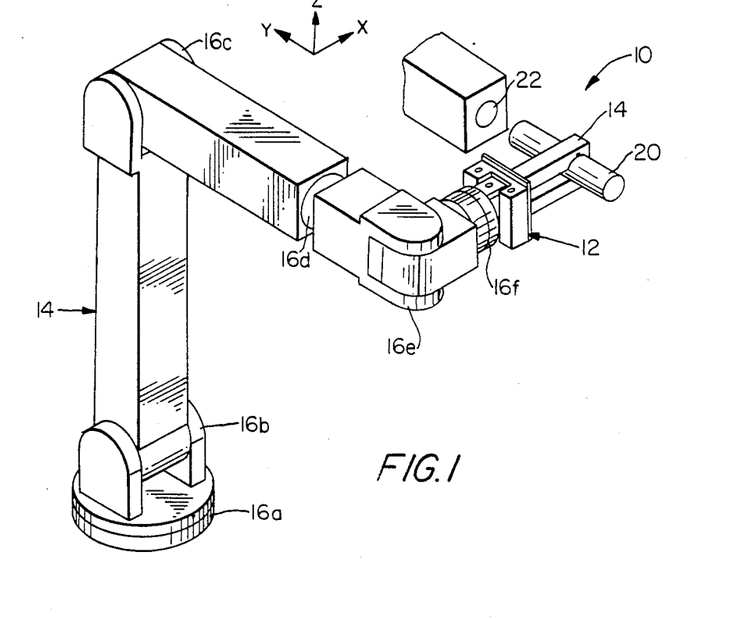
FIG. 1 is a schematic isometric view of the micromanipulator system of the present invention.
Figure 2:
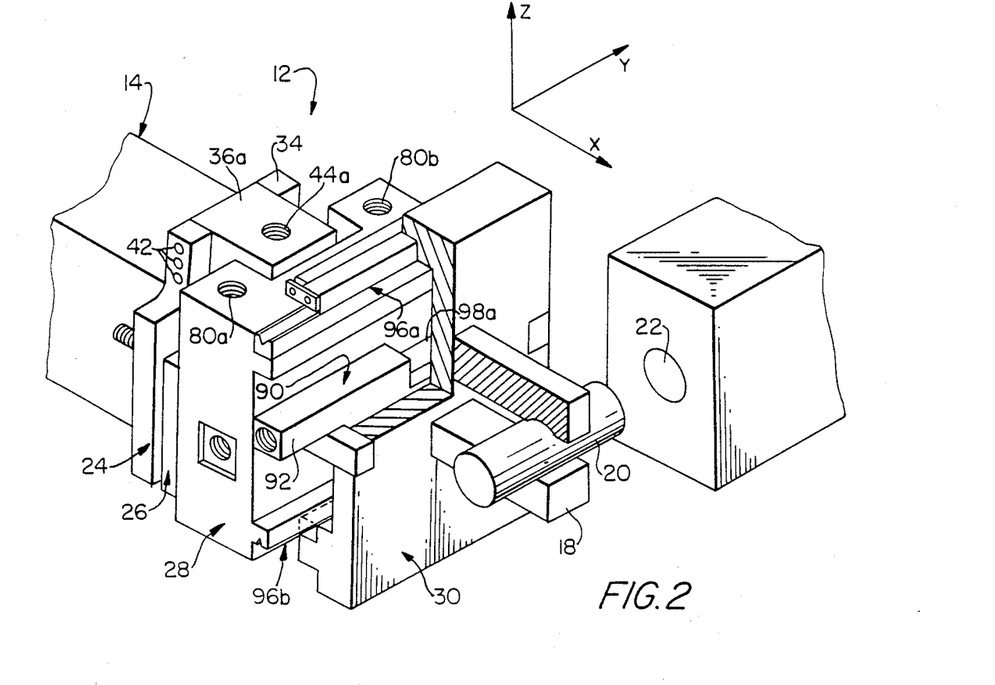
FIG. 2 is a partially broken away isometric view of the micromanipulator of the present invention.
Figure 3:
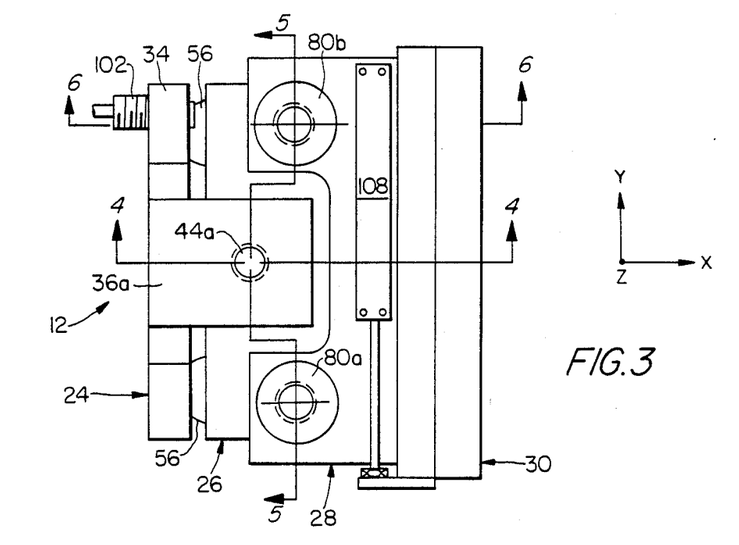
FIG. 3 is a top plan view of the micromanipulator depicted in FIG. 2.

With reference now to the drawings in which like numerals represent like elements throughout the several views, a micromanipulator system 10 according to the present invention is depicted in FIG. 1. Micromanipulator system 10 includes a micromanipulator 12 which has five degrees of freedom to allow fine positioning along and about the x and z axes and along the y axis. Micromanipulator 12 is powered by hydraulics to achieve minimum size, weight, and maximum power density. As shown in FIG. 1, micromanipulator 12 is attached to a six degree of freedom robot 14 having joints 16a, 16b, 16c, 16d, 16e, and 16f. A suitable gripper 18 or other holding means is provided on micromanipulator 12 for holding an object 20 or part which is to be placed into a hole 22.

It should be appreciated that the x dimension of micromanipulator 12 should be as small as possible to minimize the bending moments which are exerted on joints 16d, 16e, and 16f. This results in minimization of robot positioning errors and maximization of robot net payload. To accomplish this, pairs of hydraulic pistons are machined integral with supporting frames in micromanipulator 12 as explained subsequently. In addition, four way hydraulic servo valves are used to control the motion of the pistons, so that when one piston is pressurized, its antagonist is depressurized. Thus, it should also be appreciated that as one piston moves the relevant portion of micromanipulator 12, fluid is concurrently forced away from the opposing piston.

Micromanipulator 12 is preferably made of a high strength aluminum and is of a monolithic design with the hydraulic piston bores machined integral with the structure. In regions where high contact forces are present, hardened steel liners, balls, and pistons are used. To structurally attach hardened steel liners to the aluminum structure, oil resistant epoxy is used. It should further be appreciated that the ranges of required motion for the small degrees of freedom are in the order of $+/-\frac{1}{8}$ inch and $+/-4$ degrees, and for the y axis degree of freedom used to insert object 20, the motion is the order to $+/-1$ to 1.5 inch.

As shown in FIGS. 2, 3, 4, 5, and 6, micromanipulator 12 includes four main parts: a back plate 24, a middle block 26, a terminal block 28, and a platform 30. Back plate 24 is used to attach micromanipulator 12 to robot 14. Middle block 26 moves with two degrees of freedom with respect to back plate 24, and terminal block 28 moves with respect to middle block 26 in two degrees of freedom as well. Platform 30 moves with a large sliding degree of movement with respect to terminal block 28 along the y axis. It should be appreciated that gripper 18 is attached to platform 30 as shown.

Figure 4:
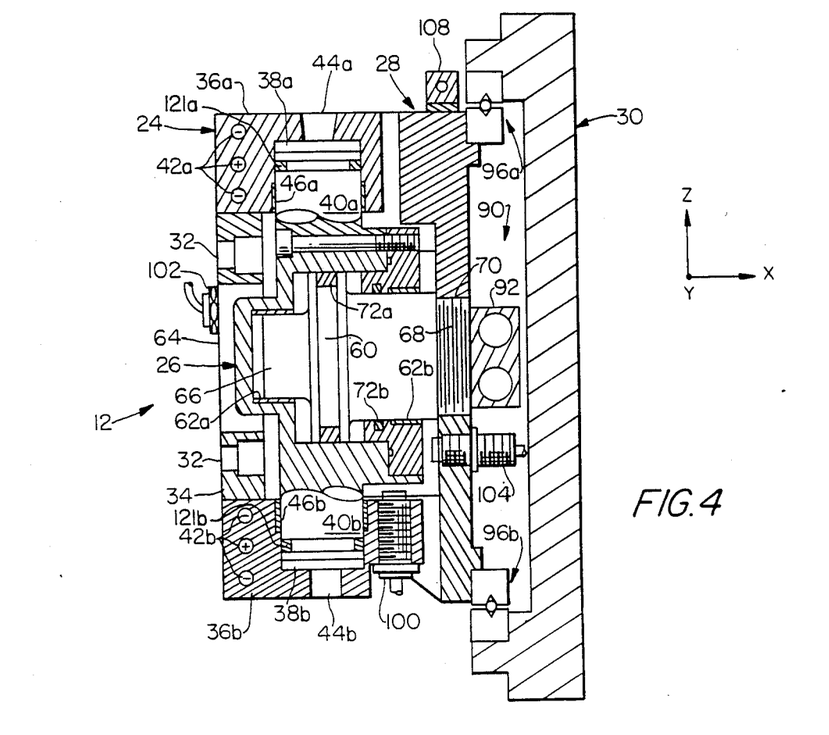
FIG. 4 is a cross-sectional elevation view of the micromanipulator depicted in FIG. 3 taken along the line 4—4.

As shown best in FIG. 4, micromanipulator 12 is attached to robot 14 by suitable bolts (not shown) located in holes 32. Back plate 24 includes a main portion 34 and side portions 36a and 36b. Side portions 36a and 36b have respective hydraulic cylinder bores 38a and 38b provided therein. Hydraulic cylinder bores 38a and 38b accommodate respective pistons 40a and 40b which have been machined integral with middle block 26. In order to assemble middle block 26 to back plate 24, side portions 36a and 36b are located about respective pistons 40a and 40b and are attached to main portion 34 by suitable bolts and dowel pins located in holes 42a and 42b. Ports 44a and 44b are provided to conduct hydraulic fluid to respective pistons 40a and 40b. Suitable seals 121a and 121b prevent leakage of hydraulic fluid from bores 38a and 38b respectively.

By appropriate movement of hydraulic fluid to a respective piston 40a or 40b (and simultaneous withdrawal of fluid from the other piston 40b or 40a), it will be appreciated that middle block 26 is moved in the z direction relative to back plate 24. Thus, movement in the z direction of middle block 26 also effects movement in the z direction of the remainder of micromanipulator 12 including platform 30.

In order to provide a smooth low friction bearing surface for movement of middle block 26 in the z direction, sleeve bearings 46a and 46b are provided. It should also be appreciated that pistons 40a and 40b further provide an axle about which middle block 26 rotates about the z axis relative to back plate 24. Thus, sleeve bearings 46a and 46b also provide a smooth bearing surface for this rotation as well. It should further be appreciated that sleeve bearings 46a and 46b resist bending movements about the y axis by acting as surfaces against which a force couple acts.

Middle block 26 also includes hydraulic cylinder bores 48a and 48b formed integrally therein. As shown best with respect to hydraulic cylinder bore 48b depicted in FIG. 6, a suitable hydraulic seal 50 surrounding piston 52 in cylinder bore 48b is used to prevent unwanted loss of pressure within the piston cavity. Hardened steel sleeves 54 act as sleeve bearings to prevent the hard steel piston 52 from scoring the aluminum bore provided in middle block 26. Pistons 52 are activated by hydraulic fluid which pushes a respective piston 52 against a respective ball 56. Balls 56 push against hardened steel inserts 58 which are trough shaped as shown. The ends of pistons 52 against which balls 56 rest are also trough shaped or a concavity. Thus, it should be appreciated that as middle block 26 rotates about the z axis using pistons 40a and 40b as an axle, balls 56 rock back and forth with a rolling motion in the trough formed by inserts 58. This rolling motion provides minimal resistance to motion about the z axis, thus increasing controllability and accuracy of the system. In addition, as middle block 26 moves back and forth in the z direction (motions caused by pistons 40a and 40b), balls 56 roll along the lengths of the trough formed by inserts 58. Thus, it should be appreciated that even though two small degrees of freedom take place simultaneouly, a rolling element is always present and prevents high friction due to metal sliding on metal. In addition, the trough shape is necessary for inserts 58 because a flat plate would be subject to contact stresses high enough to indent such a flat plate and prevent the rolling of balls 56.

It should also be appreciated that the provision of balls 56 at the end of pistons 52 is essential to the operation of the present invention. In particular, it is this construction which allows pistons 40a and 40b to act as an axle as well a moving means for middle block 26. The radii of balls 56 and inserts 58 must be chosen so that the contact stresses are not too high (radius of ball 56 approaches radius of insert 58 for minimal contact stresses) and so that ball 56 does not roll too far up the edge of insert 58 which would place high side loads on piston 52 (balls 56 on a flat plate would produce no side loads). The method of stress analysis necessary for designing the correct curvatures of insert 58 and ball 56 to prevent stress overloads is known to those of ordinary skill in the art of ball bearing design and thus will not be further discussed.

With reference to FIG. 4, it is seen that terminal block 28 moves along the x axis and about the x axis by means of a piston 60 in the manner similar to the piston-/axle arrangement of pistons 40a and 40b of middle block 26. Piston 60 is supported in the rear and front by sleeve bearings 62a and 62b, respectively. Sleeve bearings 62a and 62b function in the same manner as sleeve bearings 46a and 46b in allowing motion along and about the x axis. It should be noted that back plate 24 is provided with a central aperture 64 into which a rear portion 66 of middle block 26 extends. Rear portion 66 houses sleeve bearing 62a and allows for a maximization of the distance between bearings 62a and 62b in order to decrease the bearing contact stresses.

Piston 60 further includes a front portion 68 having screw threads thereon. Terminal block 28 is provided with a similarly threaded aperture 70 so that terminal block 28 threadably engages piston 60 as shown. A suitable keyway or adhesive is provided to prevent terminal block 28 from becoming unthreaded with front portion 68. Hydraulic seals 72a and 72b are also provided to contain the fluid around piston 60 and to prevent leakage. Thus, by pressurizing the left side of piston 60, terminal block 28 moves in the positive x direction while the pressurization of the other side of piston 60 causes terminal block to move in the negative x direction.

Figure 5:
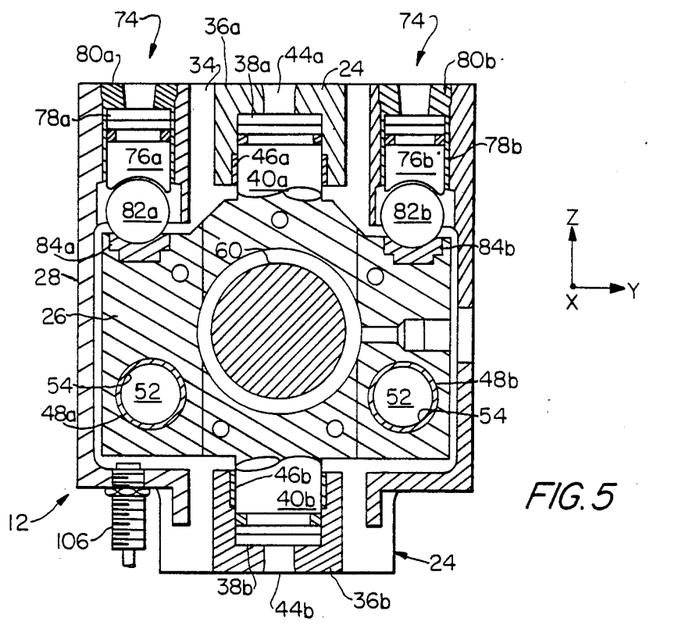
FIG. 5 is a cross-sectional elevation view of the micromanipulator depicted is FIG. 3 taken along the line 5—5.
Figure 6:
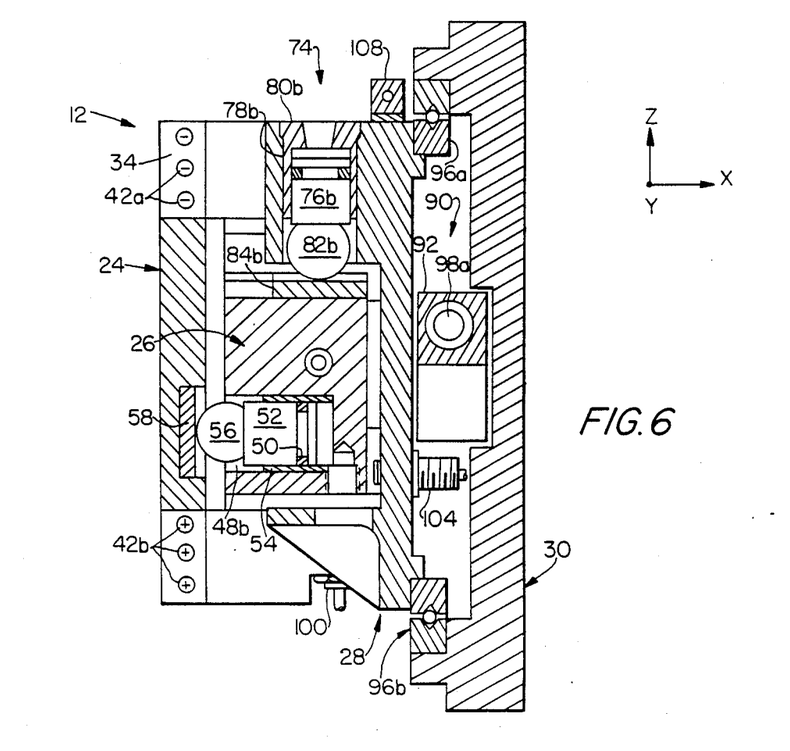
FIG. 6 is a cross-sectional elevation view of the micromanipulator depicted in FIG. 3 taken along the line 6—6.
Figure 7:
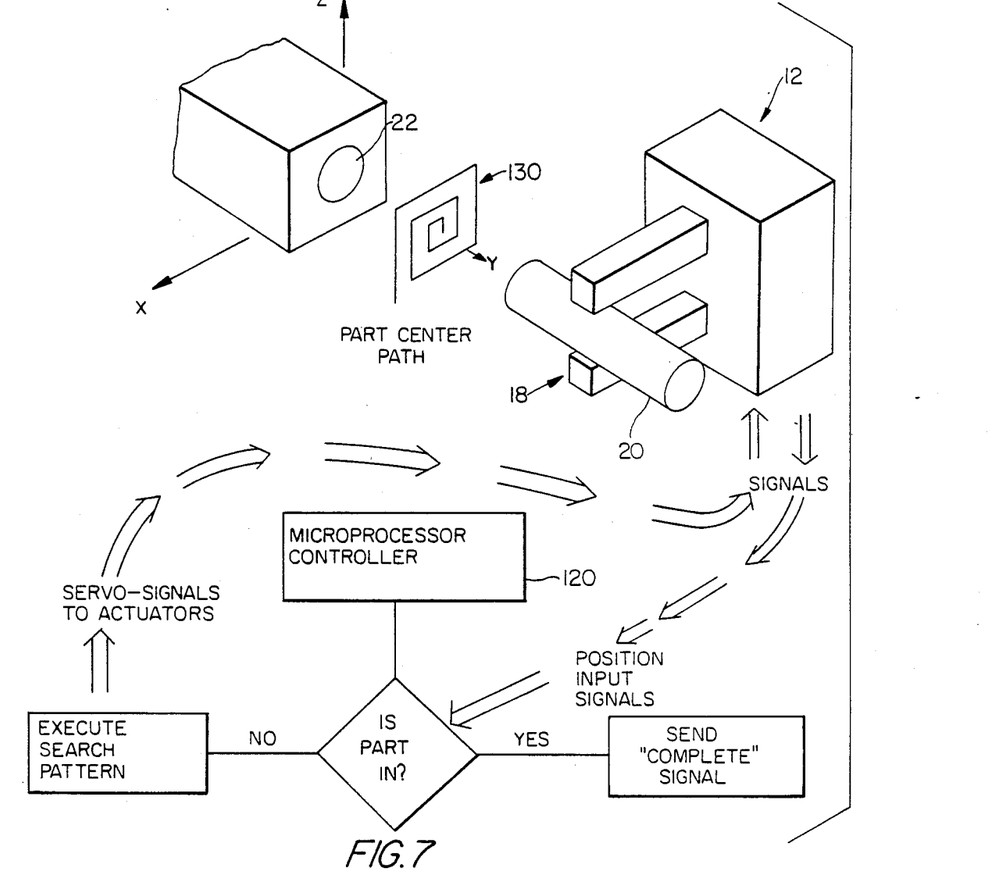
FIG. 7 is a schematic perspective view of the operation of the micromanipulator system.

As shown best in FIG. 5, an x rotation rotary actuator means 74 is provided which is similar to the z rotation rotary actuator means described above. The rotation about the x axis is allowed by use of sleeve bearings 72a and 72b which allow rotation of piston 60. X rotation rotary actuator means 74 includes pistons 76a and 76b mounted in respective piston bores 78a and 78b in terminal block 28. Piston bores 78a and 78b are formed integral with terminal block 28 and include hardened steel sleeves 80a and 80b therein to prevent hard steel pistons 76a and 76b from scoring bores 78a and 78b as terminal block 28 is preferably made of aluminum.

Pistons 76a and 76b are hydraulically actuated so as to push against a respective ball 82a and 82b. Balls 82a and 82b push against hardened steel inserts 84a and 84b, respectively, which are trough shaped as shown. As with pistons 52, the end of pistons 76a and 76b, against which respective balls 82a and 82b rest, are also trough shaped. Thus, as terminal block 28 rotates about the z axis, balls 82a and 82b roll back and forth in the troughs of steel inserts 84a and 84b. However, as terminal block 28 moves back and forth in the x direction, balls 82a and 82b roll along the lengths of steel inserts 84a and 84b, respectively. Hence, even though two small degrees of freedom take place simultaneously, a rolling element is always present and prevents high friction due to metal sliding on metal. It should be appreciated that the trough shape of steel inserts 84a and 84b could not be a flat plate as might appear advantageous. With a flat plate, the contact stresses would be high enough, when pistons 76a and 76b are actuated, to indent such a flat plate and thus prevent the rolling of balls 82a or 82b.

The remaining degree of freedom needed for micromanipulator system 10 is a large linear motion along the y axis. It should be appreciated that the other degrees of freedom have all been relatively small (+/−⅛ inch and +/−4 degrees) to allow for small corrections to an endpoint position in the xz plane. The large y motion which is desired is on the order of +/−1.5 inch and allows micromanipulator 12 to actually insert a part or object 20 into a hole 22. As shown best in FIGS. 3 and 4 a y position moving means 90 includes a piston bore structure 92 which is securely attached to terminal block 28. Moveably mounted to terminal block 28 is a gripper platform 30. Gripper platform 30 is mounted for movement in the y direction by linear bearings 96a and 96b. Linear bearings 96a and 96b thus resist movements in all other degrees of motion of gripper platform 30. Pistons 98 (only one of which is shown) extend from piston bore structure 92 in opposite directions parallel to the y axis and are attached to opposite sides of gripper platform 30. Hydraulic fluid is designed to travel through the center of pistons 98 and push on the associated bore and piston bore structure 92, causing gripper platform 30 to move in one direction or the other along the y axis.

In order to provide a position feedback for the five degrees of movement, noncontact distance measuring probes (such as eddy current probes) which sense one degree of freedom (z motion for example), but which are not effected by the associated rotational degree of freedom (motion about the z axis, for instance) are provided. Thus, sensor 100 senses motion along the z axis, but is not affected by motion about the z axis because sensor 100 cannot sense any rotation of a surface normal to its sensing line. Sensor 102 measures rotation of terminal block 28 and metal block 26 about the z axis as the rear portion of middle block 26 pivots with respect to sensor 102. Sensor 104 measures the x axis motion while sensor 106 measures motion about the x axis. Finally, sensor 108 is a linear potentiometer (or equivalent) which measures the y axis position.

The force the micromanipulator exerts on the gripper 18 is suitably operated with a coarse force control obtained by regulating pressure to the associated pistons. This can be accomplished open loop by using open center differential pressure control servo valves. These valves output a pressure proportional to an applied electric signal. Closed loop force control could be implemented by applying strain gauges to grippers 18 or by strain gauging platform 30.

The above descripton of micromanipulator 12 indicates the interrelationship of the various parts or elements. The following describes the operation of micromanipulator 12 in order to perform a certain task: the insertion of object 20 into hole 22. While there are many algorithms available for use with micromanipulator 12, a suitable method specifically developed for micromanipulator 12 is described below.

It should intially be appreciated that each motion of micromanipulator 12 is caused by differential hydraulic pressure acting on what is effectively a double acting piston. The distribution of the pressure on the two sides of the piston is controlled by a valve for each degree of freedom The force causing the motion is a function of the unbalance of hydraulic pressure on the two sides of each piston, which in turn is a function of the voltage applied to the valves. When the voltage applied to the valve is zero, the pressure on both sides of the piston is approximately the same. This condition does not result in a relaxed state (i.e., one in which the piston is free to move) since any motion will tend to cause the pressures to become unbalanced and result in a force opposing the motion. Whereas relaxation is required for the insertion algorithm described subsequently, there is no method of relaxing an individual degree of freedom. What does exist is a method of relaxing all degrees of freedom by shutting off the pressure to the manifold which supplies fluid to the valves. This is accomplished with the use of a solenoid valve which controls the hydraulic fluid flow to micromanipulator 12.

Micromanipulator 12 is controlled by a 16-bit microprocessor 120 which utilizes an 80 bit floating point math coprocessor. Also utilized are 5 analog-to-digital converters, by means of which the position sensor information is obtained and 5 digital-to-analog converters, by means of which the five hydraulic valves which regulate force are controlled. An additional digital-to-analog converter controls the solenoid valve used to shut off the hydraulic pressure to the manifold. One 9600-baud RS-232C port provides communication to either a CRT terminal or another computer.

There are three basic software constructs in the micromanipulator program. One reads the position of any degree of freedom with respect to back plate 24. Another sets the forces for each possible motion. The third causes movement to a designated location for any of the degrees of freedom, as determined by the position reading, and controls the force in order to maintain that position. All other software constructs are elaborations of these three.

Reading the position of each degree of freedom entails enabling and reading each of five 12 bit analog-to-digital converters. With proper adjustment of the position sensors, all of the ranges of motion can be divided into four thousand individually locatable points. Since four of the position sensors are nonlinear, these readings do not directly represent linear or angular displacement. By suitable calibration of micromanipulator 12 and the fitting of the calibration values to an equation, linearization is achieved, providing locations in terms of inches and degrees. Although this linearization can be built into the program, it is unnecessary for the present application. The reading construct contains a flag for each of the five different readings which indicates whether linearization should be performed. This flag, when set, causes linearization to be bypassed, thereby greatly reducing the calculations performed in obtaining position readings.

The force is set by a construct which is similar to that of reading the position. Setting the force for any motion entails enabling the particular 12 bit digital-to-analog converter and then sending an integer which represents the force to the converter. Since each of the five forces has two directions, the integer sent to the converter can be plus or minus. The increment of applicable force can therefore be approximately one two thousandth part of the maximum applicable force. The maximum force is determined by the hydraulic pressure supplied to the valves.

The third basic construct is a servo loop that causes the movement necessary to achieve and maintain a fixed position. In the servo function used, the output force (G) is calculated for any degree of freedom, using the proportional integral linear servo equation:

$$G = A0 * F + A1 * F\_PREV + G\_PREV$$

where
$A0 = K * [(TI * TAU) / 2 + 1]$
$A1 = K * [(TI * TAU) / 2 - 1]$
$F = POS\_TO - POS\_RD$
K is a constant related to the degree of freedom.
TI is the constant related to the degree of freedom.
TAU is the period of the servo loop for all degrees of freedom.
POS_TO is the desired servo position.
POS_RD is the position just read.
F_PREV is the F of the previous cycle.
G_PREV is the force value used in the previous cycle.

A timer is used that provides a TAU of about twenty milliseconds. This same TAU applies to all movements and is controlled by a clock which continues to operate regardless of what other functions are being performed by micromanipulator 12. There is a flag which, when set, causes the servo loop to be bypassed during the time period. There are also five individual flags, one for each degree of freedom, which when not set, cause the individual servo loop to be bypassed, with the result that the valve setting for that particular degree of freedom remains constant. Because of the difficulty in modeling hydraulic systems, the values of K and TI were determined by the use of a program that exercised each degree of freedom with a large motion, utilizing a wide range of K and TI. For each motion, during this program, the time necessary to obtain the desired position as well as the settling time were recorded along with K and TI being used and the size of the move. The program also recorded the minimum times for various groupings of the data. The values of K and TI to be used were then selected from among the recorded minima. The constants are readily adjusted whenever a determination is made that other values would provide better operation.

Lacking vision, micromanipulator 12 requires a sense of touch if it is to be capable of performing the insertion of a part into a hole. Although hydraulic pressure controls the force, the value of the pressure at any moment is not necessarily a useful measure of the force, because static and dynamic frictions are associated with all of the motions. In particular, the friction between the hydraulic seals and the cylinder bore is a function of the previous motion as well as present position. It is therefore impractical to calculate the mechanical force from the pressure. Without a direct measure of force or touch, it is necessary to employ a derived indication of touch.

A sense of touch is developed with the present invention by utilizing the servo loop. This touch sensing is derived from the translational y motion of object 20. As will be appreciated with reference to FIG. 2, as object 20 is moved in the y direction towards hole 22, if object 20 does not enter hole 22, object 20 encounters the area surrounding hole 22 and a a force is exerted in the y direction on object 20. This force acts on micromanipulator 12 and the five degrees freedom. By appropriately servoing pistons 52, this force acts as a moment about the z axis. Thus, during touch sensing, although pistons 52 are maintained in a fixed angular position as object 20 moves, when object 20 touches the area surrounding hole 22 and a force is exerted on the micromanipulator 12, this force causes a moment to be applied about the z axis. A comparison of the servo force for pistons 52 prior to touch with that after the touch shows a change which is used to imply the touch force. It should be appreciated that micromanipulator 12 can push with a force of about 100 pounds so that a sense of touch is necessary to prevent damage to the rest of robot 14 to which micromanipulator 12 is attached.

Important limits exist to the sense of touch. If object 20 has moved to the end of its travel as it touches, no additional moment is created and no touch will be detected. Therefore, object 20 must be operated away from its end points whenever a sense of touch is necessary. Also, if the force applied to object 20 is insufficient to overcome the static friction of object 20, no moment is caused and no touch is sensed. It is therefore quite important when trying to determine the distance of a structure by touch, that sufficient force be applied to object 20 to overcome all static friction. Another limit is that the sense of touch is primarily qualitative and not quantitative. The sense of touch can be used to initiate or stop a action (such as a move) but it is not practical to use the sense of touch to control an action (such as a push).

Figure 8:
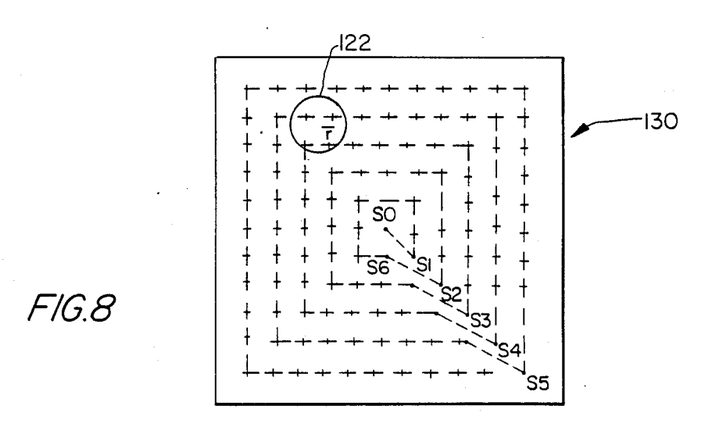
FIG. 8 is a schematic representation of a preferred search pattern for placing a part in a hole.

Positioning of object 20 in hole 22, such as a part within a lathe collet, involves the insertion of a round rod into a round hole. Various search patterns could be used for this operation. A simple rectangular search pattern 130 is preferred which involves no angular seeking but merely a search in the x and z directions. FIG. 8 shows this search pattern 130. Circle 122 represents the area from which a successful insertion can be performed. The radius (r) of circle 122 is equal to the minimum difference in radius between hole 22 and object 20 to be inserted therein.

The entire search pattern 130 for step size r contains 121 search points. If the entire circle 122 from which insertion can take place is within the total area of search, at least two search points and a maximum of four search points would fall within circle 122 with one exception. The unique pattern exists where one point falls on the center of the circle and four points fall on the circumference of the circle. In theory, the same pattern could have been performed using a step size of 1.414 r. This theoretical pattern would contain only 81 points to cover a square with sides thirteen percent longer than the maximum search pattern 130 used. With this theoretical pattern, there would be at least one and a maximim of two search points that fell within the circle, again with one exception. It arises where four search points all fall on the circumference of circle 122 and none within the circle 122 With any larger step, there would be no certainty that any point would fall within circle 122.

If all movements of micromanipulator 12 were exact and if object 20 and hole 22 were perfect circles with no protrusions on object 20, or various other possibilities did not exist, the step size of 1.414 r would be the appropriate step size. Since these imperfections do exist, the pattern of r step size, though not as theoretically efficient, appears to be a good compromise in this not perfect world.

In order to place object 20 within hole 22, not only is a search routine required, but also the ability to know when object 20 is at or within hole 22. The sense of touch, by itself, is not adequate for this purpose because it is not sufficiently sensitive to detect the difference between touching the face of hole 22 and touching the side of hole 22, when object 20 and hole 22 are not perfectly aligned. Without knowledge that the proper position has been achieved, micromanipulator 12 would always perform the entire search routine.

The method of detecting successful insertion of object 20 is to measure the distance between the base plane and the position of object 20. If object 20 has moved a distance greater than "D" from the plane, it is taken to indicate success. The value of D could be programmed and it would have to exceed the distance from the plane to hole 22. If it were programmed, the distance from the beginning of the search routine to the face at hole 22 would have to be maintained relatively constant throughout the entire usage of the program. Instead, a method is used that measures this distance before each search. It requries slightly greater time for execution of part insertion but greatly increases the flexibility and reliability of the search.

For the purpose of this discussion, one of the two translational motions perpendicular to the y motion of object 20 is used. Either of the two directions x and z would serve equally well and the x direction discussed subsequently is chosen for arbitrarily. The method starts from a base position and then moves in the x direction to the positive limit of travel. Object 20 is then moved toward hole 22 until the touch detection indicates that the face containing hole 22 has been touched. The position of object 22 is then noted and the difference in distance between this position and the base position is retained. Micromanipulator 12 is then moved again to the base position and then to the negative limit of travel in the x direction. The same touch procedure is repeated and another difference in distance is retained. A small increment is added to the larger of the absolute values of the differences and this becomes D, the distance that must be reached before the micromanipulator will consider that it is in the proper position for insertion of object 20 into hole 22. If either of these touch positions happens to be in hole 22, the value of D will be too large to detect hole 22. However, this presents no problem since under these circumstances, hole 22 is outside of the search pattern.

Recognition of a successful insertion is the most critical task of the micromanipulator software. Not only does this recognition have a primary control on the branching of the software but it influences the entire automation of the work station. Micromanipulator 12 communicates the result of a search operation to the station controller. If the recognition of success is incorrect, the station controller will have incorrect information as to what is happening at the station. Serious problems can occur, for example, when automation proceeds as if a part were in a collet when one is not.

The modus operandi of inserting object 20 into hole 22 consists of the following steps. While micromanipulator is in a base position, robot 14 positions object 20 near hole 22. Micromanipulator 12 then determines D as described above. Upon determining the value of D, micromanipulator 12 begins the search routine. At each point in the search routine it stops and moves object 12 toward hole 22 until the sense of touch indicates that object 20 has met resistance. The difference in distance between the position of object 20 and the base position of object 20 is determined at this point. If this difference in distance exceeds D, then the search routine is terminated. If the difference in distance does not exceed D, then object 20 moves back to its base position. This is then followed by a move to the next point of the search routine where the procedure is again repeated. In a test of twenty separate insertion procedures, all of which are successful in inserting the part, the median insertion time, including the determination of D, was 8.6 seconds with the lowest being 3.8 seconds and the highest being 27.8 seconds.

When the difference in distance between object 20 position and the base position exceeds D and the search routine has been terminated, the two translational positions x and z are recorded. Since the axes of object 20 and hole 22 are not necessarily perfectly aligned, some sort of compliance is needed to facilitate pushing object 20 into hole 22 without jamming. Micromanipulator 12 does not have the ability to relax particular degrees of freedom while manipulating other motions. This prevents the action of pushing object 20 in hole 22 while manipulator 12 is compliant in other directions. A quasi compliance is obtained by separating these two functions in time. It is achieved by shutting off the main hydraulic valve for about one half second, thereby relaxing all degrees of freedom. This relaxation allows micromanipulator 12 to move in directions that tend to relieve jamming before the final push is performed. The hydraulic pressure is then activated and all degrees of freedom are frozen (servoed) in their present position. Object 20 is then driven toward hole 22 by a large differential pressure for approximately one tenth of a second after which the y movement valve is put in neutral. Micromanipulator 12 then sends a message to the controlling computer indicating that it has successfully inserted object 20 into hole 22 and that it is now awaiting further instructions.

Should micromanipulator 12 proceed through the entire search routine without recognizing a success, it will then send a message to the controlling computer to the effect that there has been a failure and that it is awaiting further instructions. In this instance, the controlling computer has other options such as a repeat search or manipulation of either of the rotations before it tries another search.

Various routines have been added to the program, which while not essential to the operation, aid in the usage or enhance the performance of micromanipulator 12. One of the routines adds one more point and places it first in the search routine. The point consists of servoing the x and z positions of micromanipulator 12 to the position where the last successful insertion occurred. If nothing has shifted since the last insertion and everything operates in the same manner, this will provide for a successful insertion at the first search point. Otherwise, the search pattern will have been extended by only one point. This routine can be turned on or off and preferably defaults to on.

Another routine consists of ten selectable routines, each of which causes incremental rotations of the two rotatable axes prior to commencing the search routines. With these routines and a measurement of the depth of insertion of object 20 in hole 22, an improvement in the angle of approach to insertion can be achieved. Other optional routines include an extended set of manipulative and diagnostic operations of micromanipulator 12. However, such manipulative and diagnostic procedures are comparable in size to the rest of the program.

Although the present invention has been described with respect to exemplary embodiments thereof, it would be understood by those of ordinary skill in the art that variations and modifications can be effected within the scope and spirit of the invention.

We claim:

1. A micromanipulator system for precisely positioning an object in an xz plane and then for grossly moving the object in a y direction perpendicular to the xz plane comprising:

a base, said base defining a x axis, a y axis and a z axis;
a platform;
a mounting means for mounting said platform to said base for five different degrees of movement, the five degrees of movement being movement in the x direction, movement in the y direction, movement in the z direction, rotation about the x axis, and rotation about the z axis;
moving means for reversibly moving said platform in the five degrees of movement relative to said base, said moving means including a x position moving means for precisely positioning said platform a small distance in the x direction, a z position moving means for precisely positioning said platform a small distance in the z direction, and a y position moving means for coarsely positioning said platform a large distance in the y direction, said x position moving means and said z position moving means being linear actuators which serve as axles means about which said platform rotates about the x axis and the z axis respectively;
said base including a fixed plate and said z position moving means including a z plate such that said z position moving means pushes against said fixed plate in the z direction and said x position moving means pushes against said z plate and hence against said fixed plate in the x direction;
a rolling friction element means for providing a respective interface between a respective said actuator and one of a respective said fixed plate and said z plate, each said rolling friction element means including a concavity in the end of a respective said linear actuator, a ball located in said concavity, and a rounded trough in said fixed plate in which said ball is located such that movement along a respective x and z axis occurs as said ball rolls along the length of said trough, and movement about a respective x and z axis occurs as said ball rides up and down the sides of said rounded trough and concavity; and
a means for holding the object, said holding means being attached to said platform and moved with said platform whereby the object held by said holding means is precisely positioned in a xz plane and subsequently coarsely moved in the y direction perpendicular to the xz plane.

2. A micromanipulator system as claimed in claim 1 and further including a force detecting means for detecting an opposition force exerted on the object which opposes the coarse movement of the object in the y direction by said y position moving means.

3. A micromanipulator system as claimed in claim 2 and further including a measuring means for measuring movements of said platform in the five degrees of movement.

4. A micromanipulator system as claimed in claim 3 wherein said force detecting means is the sensing by said measuring means of a predetermined rotation about one of said x axis and z axis.

5. A micromanipulator system as claimed in claim 1 wherein said linear actuators include pairs of opposed hydraulic pistons.

6. A micromanipulator system as claimed in claim 1 wherein said moving means includes a x rotation rotary actuator and a z rotation rotary actuator.

7. A micromanipulator system as claimed in claim 6 wherein said x rotation rotary actuator and said z rotation rotary actuator are a pair of linear actuators located on opposite sides of the respective axis, which said pairs produce torques about the respective axis which are opposite to one another.

8. A micromanipulator system as claimed in claim 1 and further including a robot means for initially positioning said base adjacent the xz plane, and a search means for repetitively moving said platform adjacent the xz plane with said x position moving means and said z position moving means in a search pattern and subsequent to each move for actuating said y position moving means to attempt a desired coarse movement of the object in the y direction at the position of the search pattern in the xz plane.

* * * * *